(12) United States Patent
Carter

(10) Patent No.: US 11,154,942 B2
(45) Date of Patent: Oct. 26, 2021

(54) AUTOMATED JIGSAW

(71) Applicant: David Allen Carter, Scottsville, NY (US)

(72) Inventor: David Allen Carter, Scottsville, NY (US)

(*) Notice: Subject to any disclaimer, the term of this patent is extended or adjusted under 35 U.S.C. 154(b) by 5 days.

(21) Appl. No.: 16/595,317

(22) Filed: Oct. 7, 2019

(65) Prior Publication Data

US 2021/0101215 A1    Apr. 8, 2021

(51) Int. Cl.

| B23D 51/02 | (2006.01) |
|---|---|
| B23Q 5/34 | (2006.01) |
| B23Q 9/00 | (2006.01) |
| B23D 47/02 | (2006.01) |
| B23Q 1/52 | (2006.01) |
| B23D 59/00 | (2006.01) |

(52) U.S. Cl.
CPC ........... *B23D 47/025* (2013.01); *B23D 51/02* (2013.01); *B23D 51/025* (2013.01); *B23D 59/001* (2013.01); *B23Q 1/52* (2013.01); *B23Q 5/34* (2013.01); *B23Q 9/0064* (2013.01); *Y10T 83/698* (2015.04); *Y10T 83/875* (2015.04)

(58) Field of Classification Search
CPC .. B23Q 9/0064; B23Q 9/0078; B23Q 9/0085; B23Q 9/0092; B23D 47/02; B23D 47/025; B23D 51/02; B23D 51/025; Y10T 83/693; Y10T 83/695; Y10T 83/698; Y10T 83/875; Y10T 83/8822
USPC ............................ 83/565, 768, 614, 758, 762
See application file for complete search history.

(56) References Cited

U.S. PATENT DOCUMENTS

| 357,678 | A | * | 2/1887 | Maxwell | B21D 28/265 83/413 |
|---|---|---|---|---|---|
| 699,285 | A | * | 5/1902 | Clover et al. | B23Q 35/102 144/144.1 |
| 1,162,587 | A | * | 11/1915 | Eimann | B23K 7/004 266/58 |
| 2,973,020 | A | * | 2/1961 | Bennett | B27B 5/07 83/471.3 |
| 3,008,498 | A | * | 11/1961 | Olson | B27B 5/207 144/250.18 |
| 3,129,732 | A | | 4/1964 | Moore | |
| 3,151,642 | A | * | 10/1964 | Olson | B23D 47/02 83/486.1 |

(Continued)

FOREIGN PATENT DOCUMENTS

CH            618 914 A5 *  8/1980  ........... B23D 51/025

*Primary Examiner* — Clark F Dexter
(74) *Attorney, Agent, or Firm* — Tracy Jong Law Firm; Tracy P. Jong; Cheng Ning Jong

(57) ABSTRACT

A system for making curved cuts of a work piece, the system including a template including a profiled groove spanning from a first end to a second end, the groove dividing the template into distal and proximal halves, at least one profile of a curved cut is part of the groove; a saw including a saw blade; a turntable including a platform and a base upon which the platform is rotatably supported; and a mobility mechanism to which the platform is attached, the mobility mechanism is configured to allow the turntable to traverse between the two ends and a direction transverse to a direction defined by the two ends, wherein the work piece is disposed under the groove of the template and the saw blade is configured to be guided through the groove to cut the work piece according to the at least one profile of a curved cut.

12 Claims, 6 Drawing Sheets

(56) References Cited

U.S. PATENT DOCUMENTS

| | | | | |
|---|---|---|---|---|
| 3,259,021 | A | * | 7/1966 | Appleton et al. .... B23Q 9/0014 409/124 |
| 3,435,523 | A | | 4/1969 | Marsh |
| 3,442,309 | A | * | 5/1969 | Jentsch ................ B23Q 9/0078 144/144.1 |
| 3,741,063 | A | * | 6/1973 | Bretthauer ........... B23Q 9/0085 83/745 |
| 3,866,496 | A | * | 2/1975 | Payne et al. .............. B27B 5/07 83/471.3 |
| 4,283,044 | A | * | 8/1981 | McKibbin et al. .......................... B23K 37/0217 266/58 |
| 4,957,024 | A | * | 9/1990 | Albrecht .............. B23D 45/024 83/471.3 |
| 5,901,763 | A | | 5/1999 | You |
| 6,283,003 | B1 | * | 9/2001 | Hanson et al. .......... B26D 1/04 83/614 |
| 6,457,469 | B1 | * | 10/2002 | Mueller et al. ........ B28D 1/225 125/23.01 |
| 6,675,689 | B2 | * | 1/2004 | Nunez et al. ........... B26B 29/06 30/151 |
| 6,845,699 | B1 | * | 1/2005 | Anton .................... B27B 25/00 83/439 |
| 8,161,655 | B2 | | 4/2012 | Fuchs |
| 2006/0032356 | A1 | * | 2/2006 | Newman, Jr. et al. ..................... B23D 59/001 83/486 |

* cited by examiner

AUTOMATED JIGSAW

BACKGROUND OF THE INVENTION

1. The Field of the Invention

The present invention relates to an automated jigsaw. More specifically, the present invention is directed to an automated jigsaw for producing work pieces having curved edges.

2. Background Art

Swiss Pat. No. CH618914A5 to Achou (Hereinafter Achou) discloses a device for guiding the saw blade of a compass-saw for the multiple reproduction of the same design on a plank comprising a jig with slots which may be fixed to the surface of the plank and a guiding body fixed to the arm of the cutting out saw, with a cylindrical guide dowel or peg whose diameter corresponds to the width of the slots. The body and the dowel or peg are provided with a guiding groove for the saw blade. The longitudinal axis of the pin being used is situated in the median plane of the groove and the pin is being diametrically divided in the direction of the groove. Achou discloses the use of a cylindrical guide peg to guide the saw where the peg has a diameter corresponding to the width of the "slot." It appears however if Achou's saw is advanced by means of a pulling force in a general direction of the groove, the blade of the saw may not always point centrally along the groove. U.S. Pat. No. 3,435,523 to Marsh (Hereinafter Marsh) discloses a guide and spacer for a portable, reciprocating blade, power tool, used with a metal template for making cut outs in a fibrous material such as an automobile floor mat. The invention resides in a circular body member attached to the portable power tool and having a depending, tapered extension which is received in the opening of the metal template to guide the tool around the template. The body has a central opening for receiving the saw guide and saw blades, and the body and the extension are radially slotted so the new blades may be removed from the portable tool without removing the body from the tool. Marsh's guide and spacer is used for maintaining a gap between the blade and the work piece to prevent contact of the blade with a template. No attempts have been demonstrated in Marsh to show that the guide and spacer could be used for automatically producing work pieces having curved edges.

U.S. Pat. No. 8,161,655 to Fuchs (Hereinafter Fuchs) discloses a motor-driven, hand-guided reciprocating saw or jigsaw including a saw blade which performs a working motion and a base plate which is connected to a housing of the reciprocating saw, where an underside of the base plate is used as a bearing surface which faces a workpiece to be worked. A guide element is integrated in the base plate and extends past the bearing surface of the base plate. The guide element is provided for placement on a guide contour of a template which is connected to the workpiece. Saw teeth of saw blade are located at least approximately in the center of the guide element or are laterally offset from the center relative to the saw blade plane of the saw blade. Fuchs' device is used for aiding the cutting of a curved profile of a work piece by following an edge contour of a template. Fuchs is also silent regarding applying its device in an automated setting where the jigsaw is set up to automatically navigate a curved path while cutting a work piece.

U.S. Pat. No. 3,129,732 to Moore (Hereinafter Moore) discloses a modified template for cutting a panel from a workpiece. The saber saw operates in the same manner but in this case, the mounting bar is not rigidly attached to any central hub but may move in relation to the workpiece as determined by the periphery of the template for cutting a cut conforming to the curvature of the periphery of the template. Although Moore's device is also used for aiding the cutting of a curved profile from work piece by following an edge contour of a template, it does demonstrate in FIG. 8 of Moore a manner in which the saw is urged against the template such that the profile of the template can be followed. Again, it appears that the saw is configured only to follow an edge instead of being constrained within a groove which would have aided the advancement of the saw in a direction along a profile that is generally perpendicular to the forces used to urge the saw against the template.

U.S. Pat. No. 5,901,763 to You (Hereinafter You) discloses a working bench having a bench face marked with parallel and equally spaced scales as checker. Each intersection point is formed with a through hole for fixing the alignment or the work piece so as to facilitate the cutting operation. The bench face is further formed with a dividing disc and a ruler with metric and British scales. The cutting rail alignment includes an engaging board, a clamp, a rail slat, a rail seat, lifting shafts and a rail seat support rod.

The engaging board has a rotary shaft at one end for fitting into a central through hole of the dividing disc for selecting suitable direction. The clamp serves to clamp a free end of the engaging board so as to stably locate the engaging board by the selected direction. The width from the inner side of the saw blade of the circular saw to outer edge of the base of the circular saw is first measured and then the rail slat is fixed on the rail seat by the width. The lifting shafts are fitted into the through holes on one side of the rail seat, so that the rail seat is rotatable to cover and press the work piece. The rail seat support rod serves to clamp a free end of the rail seat. Although a work piece can be cut at any angle with You's work bench, the cuts are straight and the work piece is aligned to get one cut at a time.

There exists a need for an automated jigsaw capable for reproducing work pieces with curved edges.

SUMMARY OF THE INVENTION

In accordance with the present invention, there is provided a system for making curved cuts of a work piece, the system including:
   (a) a cradle for receiving a template having a first end, a second end and a profiled groove spanning the first end and the second end of the template, the profiled groove dividing the template into a distal half and a proximal half, wherein at least one profile of a curved cut is part of the profiled groove;
   (b) a turntable including a platform disposed in a plane and a base upon which the platform is rotatably supported, wherein the turntable is configured for receiving a saw having a saw blade disposed in a plane such that the plane in which the saw blade is disposed is substantially perpendicular to the plane in which the platform is disposed; and
   (c) a mobility means to which the platform is attached, wherein the mobility means is configured to allow the turntable to traverse between the first end and the second end of the template and a direction transverse to a direction defined by the first end and the second end of the template,
wherein the work piece is disposed under the profiled groove of the template and the saw blade is configured to be guided through the profiled groove such that the work piece disposed under the template and spanning the profiled groove can be cut according to the at least one profile of a curved cut from the first end to the second end of the template.

In accordance with the present invention, there is further provided a system for making curved cuts of a work piece, the system including:
(a) a template including a first end, a second end and a profiled groove spanning the first end and the second end of the template, the profiled groove dividing the template into a distal half and a proximal half, wherein at least one profile of a curved cut is part of the profiled groove;
(b) a saw including a saw blade disposed in a plane;
(c) a turntable including a platform disposed in a plane and a base upon which the platform is rotatably supported, wherein the saw is attached to the turntable such that the plane in which the saw blade is disposed is substantially perpendicular to the plane in which the platform is disposed; and
(d) a mobility means to which the platform is attached, wherein the mobility means is configured to allow the turntable to traverse between the first end and the second end of the template and a direction transverse to a direction defined by the first end and the second end of the template, wherein the work piece is disposed under the profiled groove of the template and the saw blade is configured to be guided through the profiled groove such that the work piece disposed under the template and spanning the profiled groove can be cut according to the at least one profile of a curved cut from the first end to the second end of the template.

In one embodiment, the system further includes a cord attached to the saw, wherein the saw is configured to be advanced through the profiled groove by the cord. In one embodiment, the cord is disposed within the profiled groove such that a pull of the cord advances the saw without binding of the saw with respect to the profiled groove. In one embodiment, the system further includes a bracket configured for surrounding the saw blade at an offset such that the saw blade does not come in contact with the bracket, the bracket is configured to prevent direct contact of the saw blade against the profiled groove. In one embodiment, the profiled groove is configured to be lined with a material having a hardness that is at least as high as the hardness of the saw blade. In one embodiment, the system further includes a reel configured for taking up the cord to advance the saw from the first end to the second end of the template. In one embodiment, the reel is rotated for taking up the cord using a device selected from the group consisting of a motorized rotary device and a hand-powered rotary device. In one embodiment, the saw is an electrical saw and the system further includes an electrical switch for controlling the operation of the saw and the operation of the motorized rotary device and a protrusion operably coupled to the electrical switch, the protrusion is configured to be attached to a portion of the mobility means, wherein upon the mobility means arriving at the second end of the template, the protrusion is configured to contact the switch to deactivate the saw and the motorized rotary device.

The work piece has a leading end and a trailing end. In one embodiment, the system further includes a stop disposed under the distal half of the template and the stop is configured for positioning the work piece with the leading end of the work piece contacting the stop when the work piece is positioned by disposing the work piece in a direction from the trailing end to the leading end of the work piece from the proximal half of the template to the distal half of the template.

An object of the present invention is to provide a system for automatically making curved cuts to work pieces.

Another object of the present invention is to provide a system for automatically making curved cuts to work pieces to repeatably produce work pieces with curved edges.

Another object of the present invention is to provide a system for automatically making curved cuts to work pieces where the device is economically feasible to procure and operate.

Another object of the present invention is to provide a system for automatically making curved cuts to work pieces where commonly-available tools can be adopted to be used in conjunction with some unique components of the system, thereby reducing the need of a user in procuring tools which have already been in the possession of the user.

Whereas there may be many embodiments of the present invention, each embodiment may meet one or more of the foregoing recited objects in any combination. It is not intended that each embodiment will necessarily meet each objective. Thus, having broadly outlined the more important features of the present invention in order that the detailed description thereof may be better understood, and that the present contribution to the art may be better appreciated, there are, of course, additional features of the present invention that will be described herein and will form a part of the subject matter of this specification.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

PARTS LIST

- 2—automated jigsaw
- 4—cradle
- 6—template
- 8—work piece
- 10—cord
- 12—turntable
- 14—platform
- 16—wheel
- 18—rail
- 20—stop
- 22—clamp
- 24—protrusion
- 26—switch
- 28—take-up device
- 30—jigsaw
- 32—saw blade
- 34—cushion
- 36—reel
- 38—strip
- 40—turntable base
- 42—shield
- 44—set screw
- 46—bracket
- 48—guide
- 50—rail
- 52—power supply (wall power or portable power supply)
- 54—work piece
- 56—marking
- 58—profiled groove
- 60—support
- 62—jig
- 64—distal half
- 66—proximal half
- 68—hand-powered rotary device
- 70—direction
- 72—base
- 74—angle
- 76—direction of rotation of saw
- 78—line Particular Advantages of the Invention The present automated jigsaw enables hands-off production of work pieces with curves without the costs and investments involved in a sophisticated system, e.g., a computer numerical control or CNC machine. The present automated jigsaw is useful for producing work pieces to certain specifications and dimensions based on templates. Therefore, in order to produce certain cuts, one needs only to install the specific template for the particular profile desired. Further, multiple cuts of multiple profiles can be made in a single pass of the automated jigsaw, making it possible to produce all necessary pieces to construct an object.

DETAILED DESCRIPTION OF A PREFERRED EMBODIMENT

The term "about" is used herein to mean approximately, roughly, around, or in the region of. When the term "about" is used in conjunction with a numerical range, it modifies that range by extending the boundaries above and below the numerical values set forth. In general, the term "about" is used herein to modify a numerical value above and below the stated value by a variance of 20 percent up or down (higher or lower).

Figure 1:
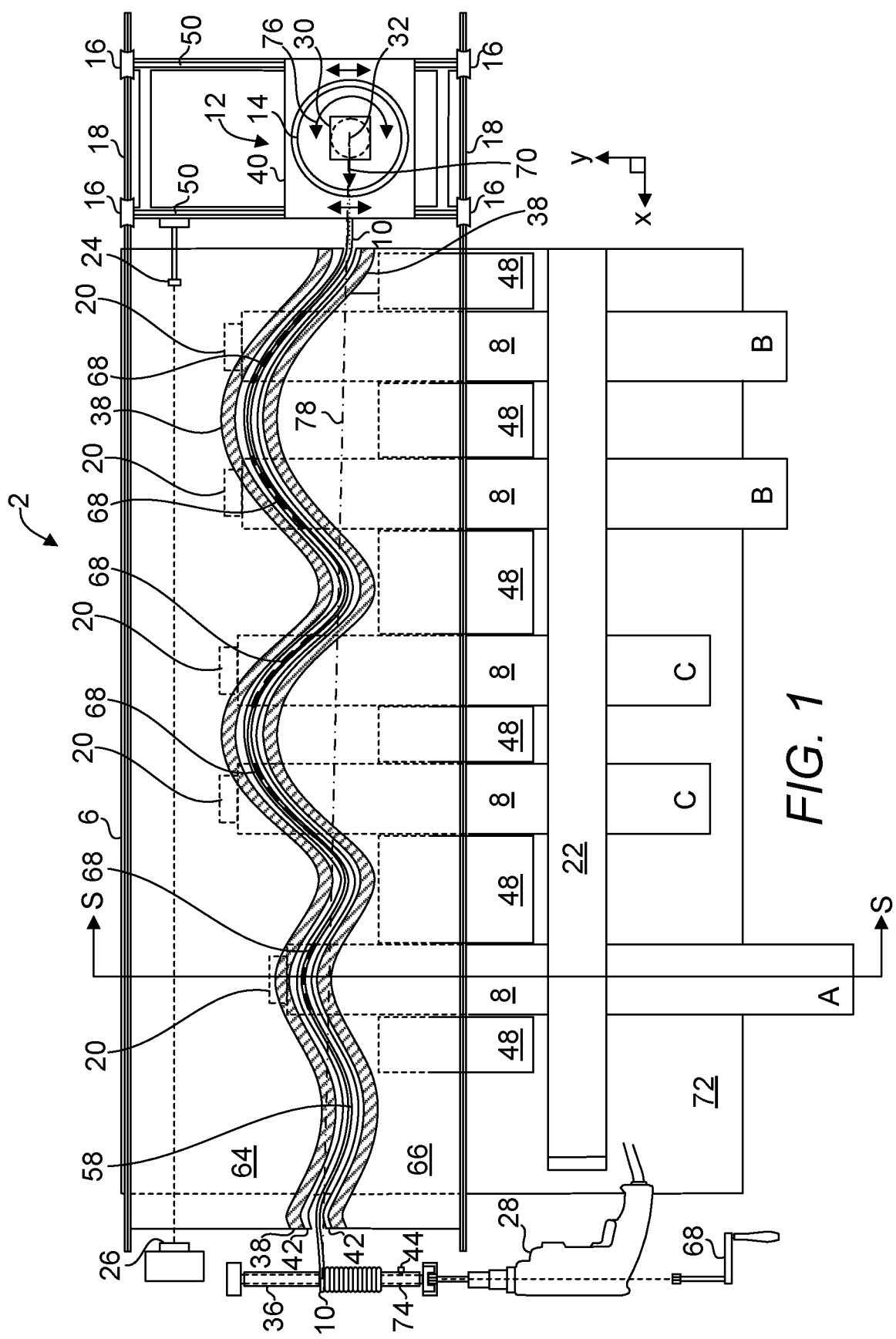
FIG. 1 is a top view of one embodiment according to the present automated jigsaw.
Figure 2:
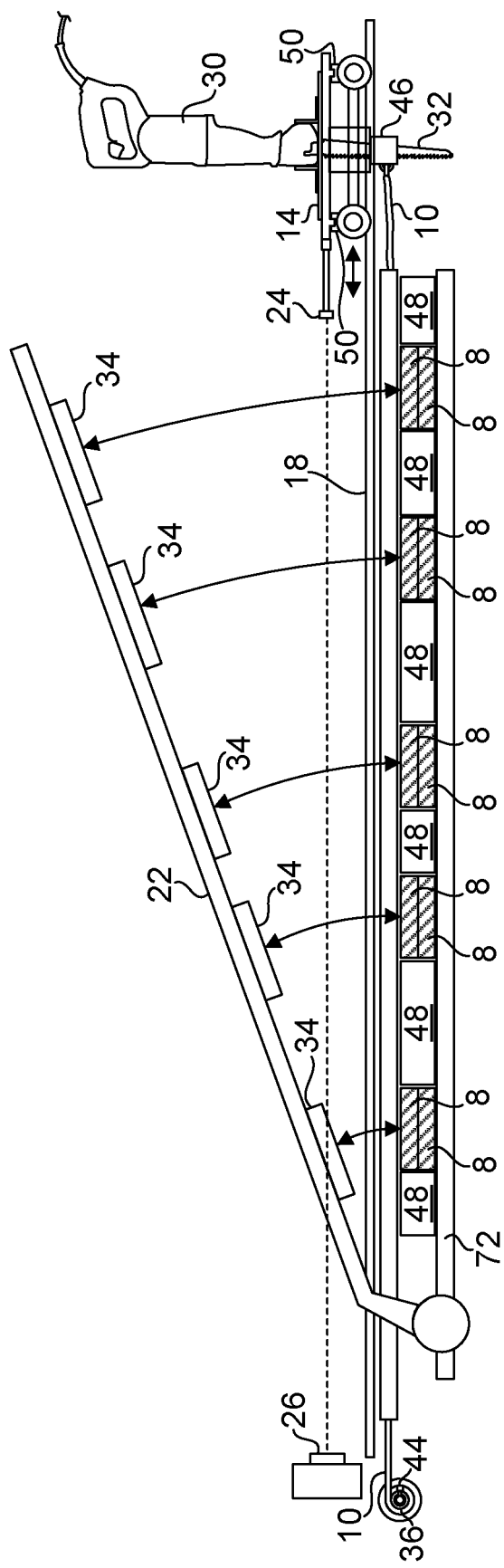
FIG. 2 is a side view of one embodiment according to the present automated jigsaw.

FIG. 1 is a top view of one embodiment according to the present automated jigsaw system 2. The system 2 is essentially useful for making curved cuts of one or more work pieces, made of materials, e.g., wood, plastic, composite materials. In one embodiment, the system 2 includes a template 6, a saw 30, a turntable 12 and a mobility means for the turntable. The template 6 includes a first end, a second end and a profiled groove 58 spanning the first end and the second end of the template 6, the profiled groove 58 dividing the template 6 into a distal half 64 and a proximal half 66. In this example, the profiled groove 58 is used to accommodate five profiles, each for a curved cut in a work piece 8. The five profiles are used for making one curved cut of work piece A, two curved cuts of work pieces C and two curved cuts of work pieces B. The saw 30 includes a saw blade 32 disposed in a plane. The turntable 12 includes a platform 14 and a base 40 upon which the platform 14 is rotatably supported. The base 40 is attached to the mobility means. The saw is attached to the turntable such that the plane in which the saw blade 32 is disposed is substantially perpendicular to the plane in which the platform 14 is disposed and the saw is able to rotate about the central axis of the saw in direction 76. The mobility means is configured to allow the turntable to traverse between the first end and the second end of the template and a direction transverse to a direction defined by the first end and the second end of the template. Each work piece 8 is disposed under the profiled groove 58 of the template 6 and the saw blade 32 is configured to be guided through the profiled groove 58 such that the work piece 8 disposed under the template 6 and spanning the profiled groove 58 can be cut according to the profile of the profiled groove 58 disposed over the work piece 8 when the saw 30 is moved from the first end to the second end of the template in direction 70. The turntable 12 is mounted on a base 40 having wheels 16 which ride on rails 18 to facilitate the movement of turntable in from the first end to the second end while making cuts in the work pieces 8. Movements of the turntable 12 in the transverse direction are facilitated using rails 50 as shown in FIG. 2. In moving the saw 30 from the first to the second end of the template, a cord 10 attached to the saw at bracket 46 or another portion of the saw, is reeled in or taken up by a reel 36, advancing the saw through the profiled groove 58 from the first to the second end. As the saw 30 is mounted on a turntable that is capable of movements in the longitudinal and transverse directions of the template 6 and capable of rotation about its central axis, the saw 30 is capable of being orientated to approximate a tangent to the profiled groove 58 at any position while disposed in the profiled groove 58. In one embodiment, the cord 10 is disposed within the profiled groove 58 such that a pull of the cord advances the saw without binding of the saw with respect to the profiled groove 58. If the cord had been disposed outside of the groove, a tug on the cord will cause the cord to be disposed in a straight configuration (e.g., along line 78 in FIG. 1) connecting the saw to the reel without conforming to the shape of the groove, guiding the saw in a direction from the saw to the point of the reel to which the cord tangents. However, this direction may not be tangent to the groove, causing the saw to be pulled in a direction that tends to move away from a path allowed by the groove, thereby increasing binding of the saw against the groove. In one embodiment, the saw is configured to advance with or without engaging a work piece at a speed of from about 13 cm/minute to about 50 cm/minute. The system further includes the bracket 46 configured for substantially surrounding the saw blade 32 at an offset such that the saw blade 32 does not come in contact with a shield 42 which lines each side of the profiled groove 58. The shield 42 is in turn supported on one side with a resilient strip 38, e.g., one which is made from a resilient material, e.g., rubber and foam, etc., to more ably absorb any vibrations caused by the saw. The bracket 46 prevents direct contact of the saw blade 32 against the shield 42. In one embodiment, the shield 42 is constructed from a material having a hardness that is at least as high as the hardness of the saw blade 32 to prevent the saw blade 32 from cutting into the materials on each side of the groove 58 so that the integrity of the groove 58 is maintained. In one embodiment, the reel 36 is rotated for taking up the cord 10 using a motorized rotary device, e.g., take-up device 28, e.g., a powered drill or a powered screw driver and a hand-powered rotary device 68. One end of the reel is adapted to the output shaft of the power tools or the hand-powered rotary device 68. In one embodiment, the saw is an electric saw, e.g., a jigsaw, bandsaw, scrollsaw, etc., as long as the blade is sufficiently shallow in height to allow it to pass through the profiled groove 58. In another embodiment, the saw is a gas-powered saw, e.g., a jigsaw, bandsaw, scrollsaw, etc. and the motorized rotary device is also a gas-powered device. Suitable protrusions are disposed at appropriate locations to depress on-off buttons of the gas-powered saw and motorized rotary device to automatically turn those equipment off when the saw reaches the second end of the template while in use. Gas-powered equipment provide an alternative means for operating the automatic jigsaw especially where electrical power is not readily available, e.g., at remote or access-limited locations. In one embodiment, a positional-based automatic saw shut-off system is provided to ensure that the jigsaw does not continue to operate upon the jigsaw having completed its travel path. In this example, an electrical switch 26 is provided for controlling the operation of the saw 30 and the operation of the motorized rotary device 28. A protrusion 24 operably coupled to the electrical switch 26 is further provided. The protrusion 24 is configured to be attached to a portion of the mobility means, wherein the protrusion is positioned such that upon the mobility means arriving at the second end of the template, the protrusion 24 contacts the switch 26 to deactivate the saw 30 and the motorized rotary device 28. Each work piece, e.g., a ubiquitous 1×6, 2×4, 2×6, etc., lumber has a leading end and a trailing end. The present automated jigsaw system 2 further includes a stop 20 or a block disposed under the distal half of the template and the stop 20 is configured for positioning the work piece with the leading end of the work piece contacting the stop when the work piece is positioned by disposing the work piece in a direction from the trailing end to the leading end of the work piece from the proximity half 66 of the template to the distal half 64 of the template.

FIG. 2 is a side view of one embodiment according to the present automated jigsaw system 2. The automated jigsaw system 2 is shown with a device for securing work pieces 8 disposed in an open position. The device is essentially a base 72 upon which a plurality of blocks or guides 48 are disposed. These guides 48 facilitate the insertion of the work pieces 8 to be cut. The clamp 22 hingedly connected to the base 72 is provided to allow pressure to be exerted on a work piece 8 disposed on the base 72 to secure it in place. Cushions 34 are disposed at locations where once the clamp 22 has been closed against the base 72 that appropriate pressure is applied to the work pieces 8 to properly immobilize them for cutting. Referring to FIGS. 1 and 2, when the cord 10 has been reeled in to a point that the cutting actions along the travel path of the saw has been completed or any time when the saw 30 is desired to be returned to the first end of the template 6, the reel 36 may be detached from its core 74 by distancing set screw 44 from the core 74, disengaging the reel 36 from the core 74. The saw can then be moved back manually to the first end of template 6, unfurling the cord 10 from the reel 36.

Figure 3:
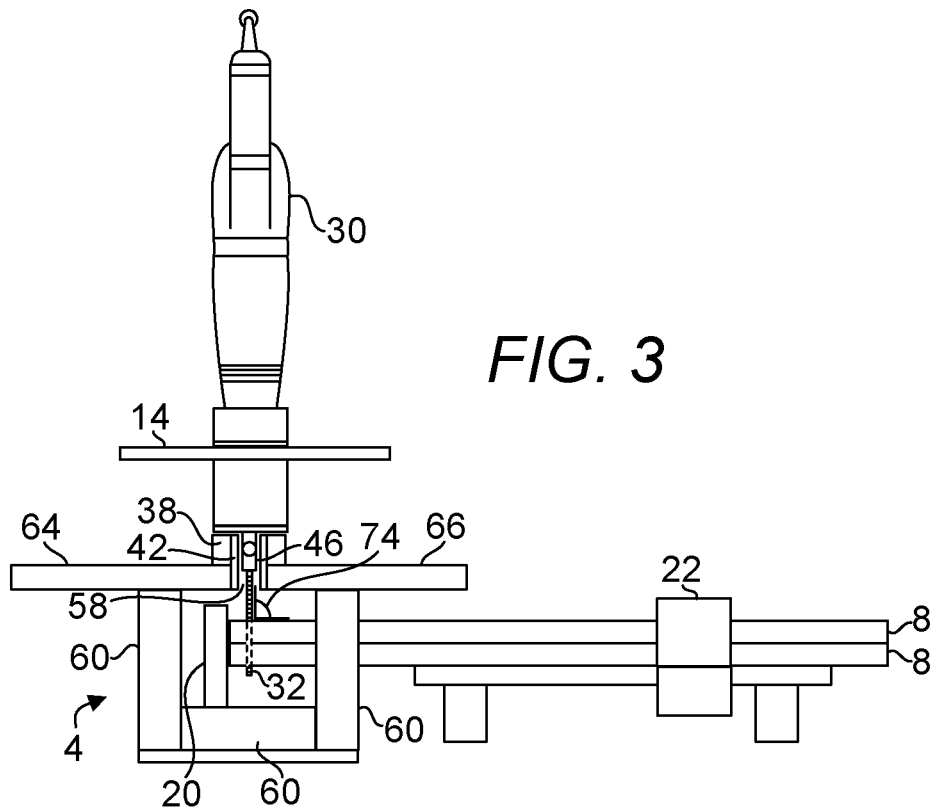
FIG. 3 is a front view of a partial cross-sectional view of the system shown in FIG. 1 as if a section is taken along line S-S of FIG. 1.

FIG. 3 is a front view of a partial cross-sectional view of the system shown in FIG. 1 as if a section is taken along line S-S of FIG. 1. Note that there are two work pieces 8 that are stacked so that two work pieces of the same curved cut can be made at once. Alternatively, if only one work piece 8 is required, then only one work piece will be used for a curved cut of a particular profile. The work piece 8 is loaded with its top or bottom surface substantially perpendicular to the saw blade 32, i.e., angle 74 is about 90 degrees. The leading end of each work piece 8 is disposed under the distal half 64 so that a cut can be made. The stop 20 is preferably disposed as close to the profiled groove 58 as possible to minimize wastes. In this example, the template that is made up of the distal half 64 and the proximal half 66 is supported by a cradle 4 made up of three supports 60, two of which are disposed in parallel each supporting a half and the third connecting the two vertical supports 60. This cradle can be duplicated to support the template at regular intervals or at two longitudinal ends of the template.

Figure 4:
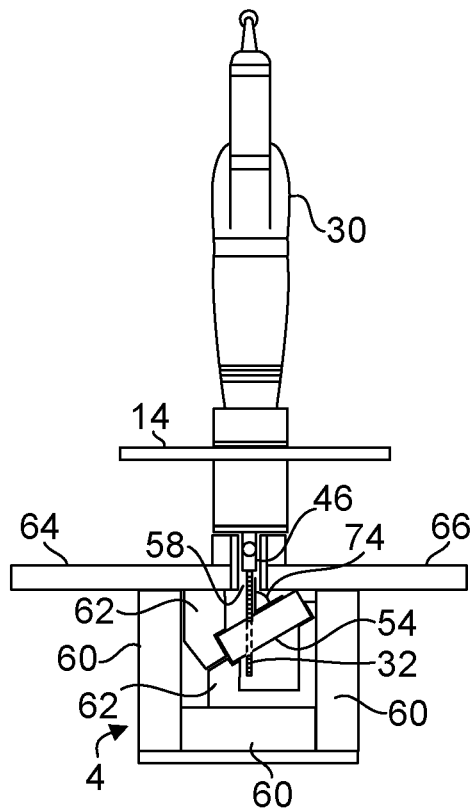
FIG. 4 is a front view of a partial cross-sectional view of the system shown in FIG. 1 as if a section is taken along line S-S of FIG. 1 and a work piece is angled to create a curved cut in the third dimension.

FIG. 4 is a front view of a partial cross-sectional view of the system shown in FIG. 1 as if a section is taken along line S-S of FIG. 1 and a work piece 54 is angled at angle 74 to create a curved cut in the third dimension, i.e., in addition to the cuts made in the x and y directions shown in FIG. 1. The work piece 54 is secured using a jig 62 that clamps down on the work piece 54.

Figure 5:
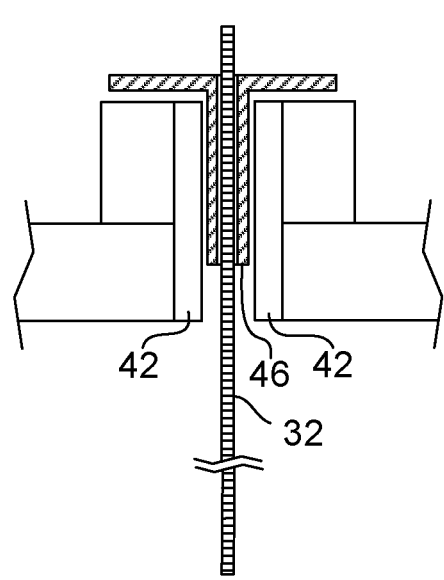
FIG. 5 is a close-up partial cross-sectional front view of a bracket of a blade configured for guiding the blade through a groove through which the blade is disposed.

FIG. 5 is a close-up partial cross-sectional front view of the bracket 46 for the blade 32 configured for guiding the blade 32 through a groove 58 through which the blade 32 is disposed. The bracket 46 is composed essentially of two angled extruded stocks each on a side of the shield 42. A gap is maintained all around the blade 32 so that the blade 32 does not come in contact with the shield 42. The shield 42 protects the groove 58 from accidental contact or damage that can occur due to the contact with the saw 32.

Figure 6:
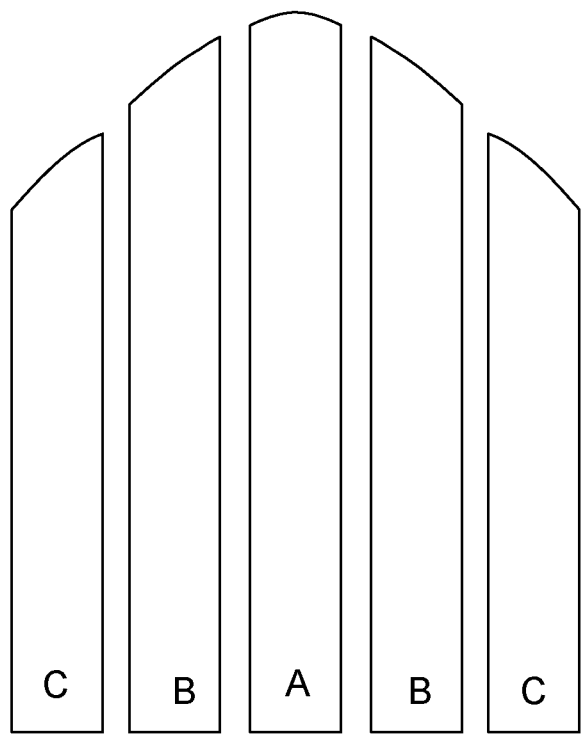
FIG. 6 is a diagram showing an example of the work pieces which have been cut into shape.

FIG. 6 is a diagram showing an example of the work pieces 8 which have been cut into shape. Referring back to FIG. 1, it shall be noted that at least one set of work pieces labelled "A," "B," "C," "D" and "E" can be obtained in one pass of the saw 30 from the first end of the second end of the template. Here, all the pieces constituting the back of an Adirondack chair can be obtained by running the saw 30 in one pass, saving time and effort in obtaining such pieces with their respective curved cuts.

Figure 7:
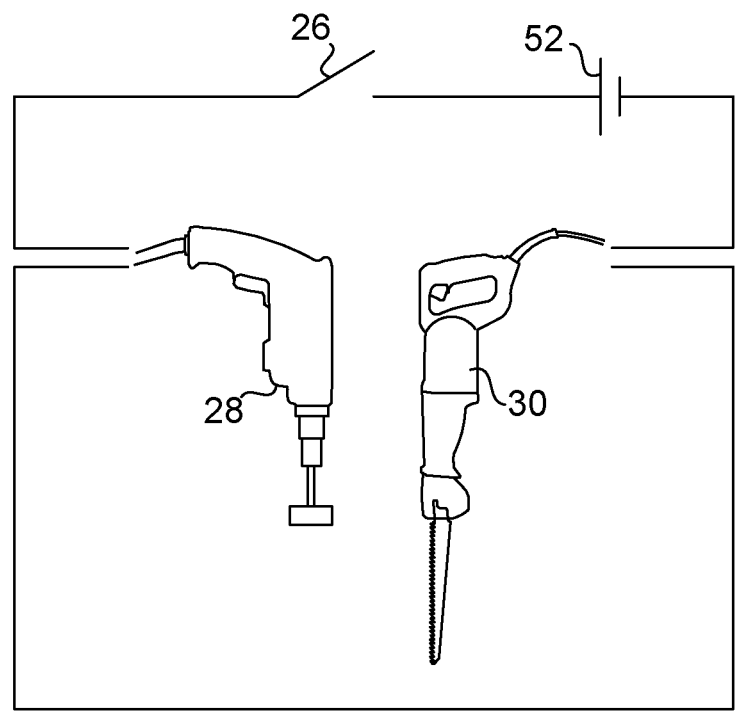
FIG. 7 is a simplified circuit diagram showing a saw, a tool for advancing the saw, a power source and a switch configured to selectively drive the saw and the tool.

FIG. 7 is a simplified circuit diagram showing the saw, the tool for advancing the saw, a power source 52 and the switch 26 configured to selectively drive the saw 30 and the tool 28. Here, the switch 26 is interposed in a circuit to which the saw 30 for cutting work pieces and the tool 28 for rotating the reel 36 in advancing the saw 30 through a profiled groove 58 are connected to control whether the saw 30 and tool 28 should continue to operate. The switch 26 is closed to advance the saw 30 from the first end to the second end of the template before switch 26 becomes opened to terminate the saw 30 and its advancement when the saw has arrived at the second end of the template. The power source 52 can be a portable power supply, e.g., from a battery or a portable power generator. The power source 52 can simply be wall power.

Figure 8:
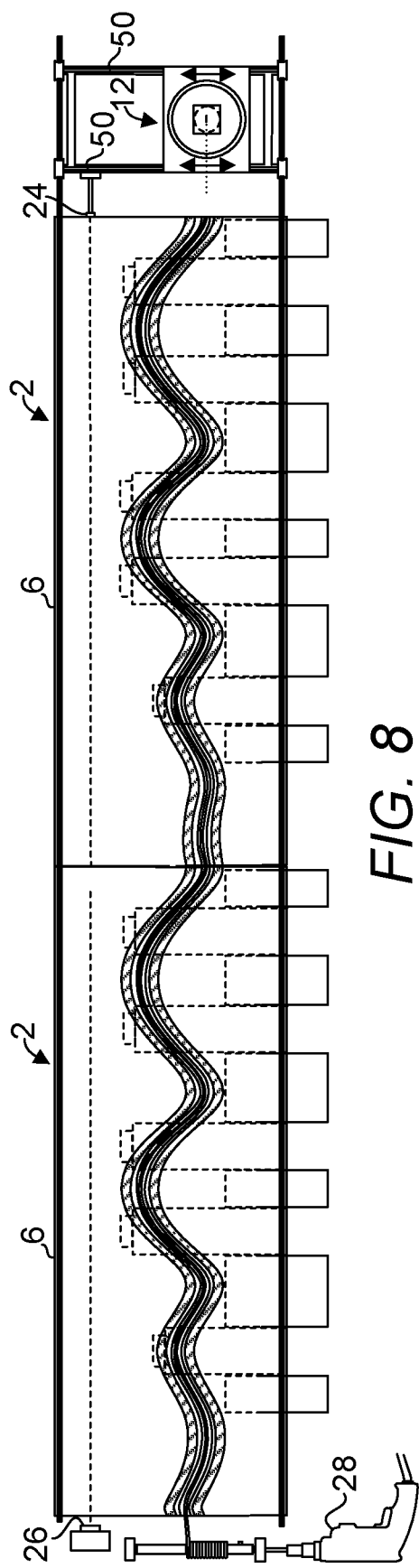
FIG. 8 is a diagram showing more than one template being used in a single pass of the present automated jigsaw to increase productivity.

FIG. 8 is a diagram showing more than one template 6 being used in a single pass of the present automated jigsaw to increase productivity. Here, two templates 6 are being used. The templates 6 can be identical or they can be of unique patterns as long as the entry point of the profiled groove of a second template matches the exit point of the profiled groove of the first template to ensure that the saw 30 can traverse seamlessly from the first template to the second template.

Figure 9:
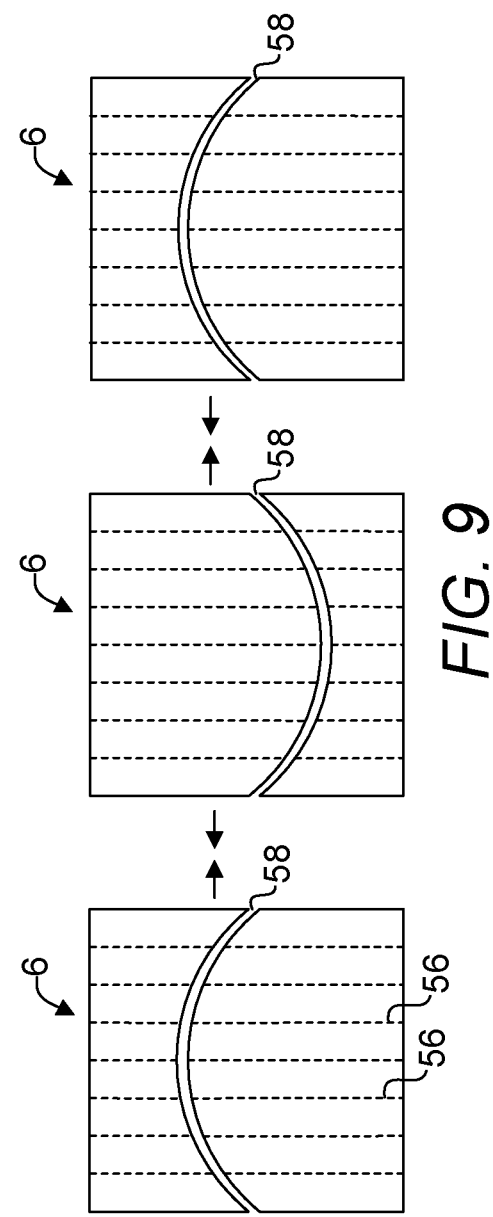
FIG. 9 is a diagram depicting a composite template composed from templates of rudimentary curves.

FIG. 9 is a diagram depicting a composite template composed from templates of rudimentary curves. Here, each template may contain only one profile of a curved cut. So, each template may only be used for one curved cut. In order to make multiple curved cuts in a single pass, multiple curved cuts are ganged together so that multiple cuts can be made in a single pass. By providing only one profile of a curved cut with each template, a user can simply select the necessary templates to form the cuts that are necessary for all of the work pieces intended in a single pass. Again, as long as the entry point of the 58 profiled groove of a second template matches the exit point of the 58 profiled groove of the first template, the saw 30 can traverse seamlessly from the first template to the second template. In the embodiment shown, markings 56 are further provided as guides for lining up work pieces with each template.

Figure 10:
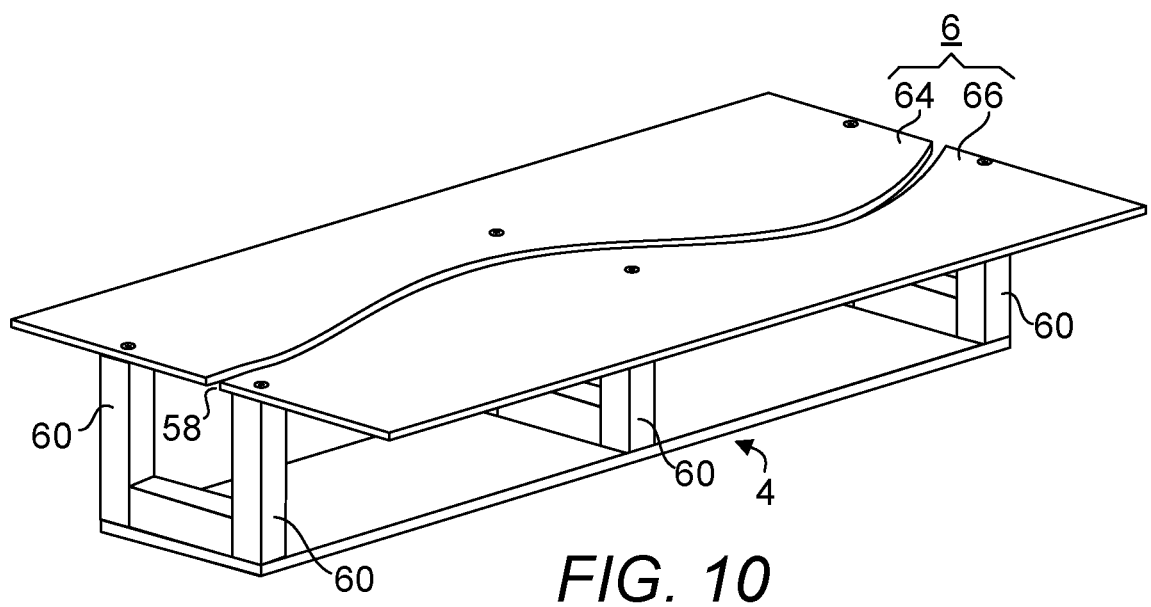
FIG. 10 is a top side front view of one embodiment of a template as supported by a cradle.

FIG. 10 is a top side front view of one embodiment of a template 6 as supported by a cradle 4. Note that the template 6 is composed of the two halves 64, 66, each supported on a plurality of supports 60 of the cradle 4 as long as the profiled groove 58 is sufficiently clear of any obstructions unrelated to having one or more work pieces cut to shape.

The detailed description refers to the accompanying drawings that show, by way of illustration, specific aspects and embodiments in which the present disclosed embodiments may be practiced. These embodiments are described in sufficient detail to enable those skilled in the art to practice aspects of the present invention. Other embodiments may be utilized, and changes may be made without departing from the scope of the disclosed embodiments. The various embodiments can be combined with one or more other embodiments to form new embodiments. The detailed description is, therefore, not to be taken in a limiting sense, and the scope of the present invention is defined only by the appended claims, with the full scope of equivalents to which they may be entitled. It will be appreciated by those of ordinary skill in the art that any arrangement that is calculated to achieve the same purpose may be substituted for the specific embodiments shown. This application is intended to cover any adaptations or variations of embodiments of the present invention. It is to be understood that the above description is intended to be illustrative, and not restrictive, and that the phraseology or terminology employed herein is for the purpose of description and not of limitation. Combinations of the above embodiments and other embodiments will be apparent to those of skill in the art upon studying the above description. The scope of the present disclosed embodiments includes any other applications in which embodiments of the above structures and fabrication methods are used. The scope of the embodiments should be determined with reference to the appended claims, along with the full scope of equivalents to which such claims are entitled.

What is claimed herein is:

1. A system for making curved cuts of a work piece, said system comprising:
    (a) a cradle for receiving a template, the template having a first end, a second end and a profiled groove spanning the first end and the second end of the template, the profiled groove dividing the template into a distal half and a proximal half, wherein at least one profile of a curved cut is part of the profiled groove;
    (b) a turntable comprising a platform and a base, said platform disposed in a plane and said platform is rotatably supported upon said base, wherein said turntable is configured for receiving a saw having a saw blade disposed in a plane such that the plane in which the saw blade is disposed is substantially perpendicular to the plane in which said platform is disposed;
    (c) a first mobility mechanism attached to said base and a second mobility mechanism attached to said base, wherein said first mobility mechanism is for movably supporting said turntable for movement in a first direction to traverse between the first end and the second end of the template, and said second mobility mechanism is for movably supporting said turntable for movement in a second direction transverse to said first direction;
    (d) a cord configured to be attached to the saw;
    (e) a reel connected to said cord, said reel is configured for taking up said cord to advance the saw from the first end to the second end of the template, wherein said reel is rotated for taking up said cord using a device selected from the group consisting of a motorized rotary device and a hand-powered rotary device; and
    (f) an electrical switch and a protrusion, the saw is an electrical saw, said electrical switch configured for controlling the operation of the saw and the operation of said motorized rotary device, said protrusion is attached to a portion of said base, wherein upon said base arriving at the second end of the template, said protrusion is configured to contact said switch to deactivate the saw and said motorized rotary device, wherein the work piece is disposable under said profiled groove of the template and the saw blade is configured to be guided through said profiled groove such that the work piece disposed under the template and spanning said profiled groove can be cut according to said at least one profile of a curved cut from the first end to the second end of the template.

2. The system of claim 1, wherein said cord is disposable within the profiled groove such that a pull of said cord will advance the saw without binding of the saw with respect to the profiled groove.

3. The system of claim 1, further comprising a bracket comprising two angled extruded stocks, each comprising a wall configured to be disposed on one of two sides of the saw blade at an offset such that the saw blade does not come in contact with said bracket, said bracket is configured to prevent direct contact of the saw blade against a side wall of the profiled groove.

4. The system of claim 1, wherein the profiled groove comprises two side walls, each side wall is configured to be lined with a shield constructed from a material having a hardness that is at least as high as the hardness of the saw blade.

5. The system of claim 1, wherein the work piece having a leading end and a trailing end, said system further comprises a stop disposed under said distal half of said template and said stop is configured for positioning the work piece with the leading end of the work piece contacting the stop when the work piece is positioned by disposing the work piece in a direction from the trailing end to the leading end of the work piece from said proximal half of said template to said distal half of said template.

6. A system for making curved cuts of a work piece, said system comprising:
(a) a template comprising a first end, a second end and a profiled groove spanning said first end and said second end of said template, said profiled groove dividing said template into a distal half and a proximal half, wherein at least one profile of a curved cut is part of said profiled groove;
(b) a saw comprising a saw blade disposed in a plane;
(c) a turntable comprising a platform and a base, said platform disposed in a plane and said platform is rotatably supported upon said base, wherein said saw is attached to said turntable such that said plane in which said saw blade is disposed is substantially perpendicular to said plane in which said platform is disposed;
(d) a first mobility mechanism attached to said base and a second mobility mechanism attached to said base, wherein said first mobility mechanism is for movably supporting said turntable for movement in a first direction to traverse between said first end and said second end of said template, and said second mobility mechanism is for movably supporting said turntable for movement in a second direction transverse to said first direction; and
(e) a cord attached to said saw, wherein said saw is configured to be advanced through said profiled groove by said cord and said cord is disposed within said profiled groove such that a pull of said cord advances said saw without binding of said saw with respect to said profiled groove,
wherein the work piece is disposable under said profiled groove of said template and said saw blade is configured to be guided through said profiled groove such that the work piece disposed under said template and spanning said profiled groove can be cut according to said at least one profile of a curved cut from said first end to said second end of said template.

7. The system of claim 6, further comprising a bracket comprising two angled extruded stocks, each comprising a wall configured to be disposed on one of two sides of the saw blade at an offset such that the saw blade does not come in contact with said bracket, said bracket is configured to prevent direct contact of the saw blade against a side wall of the profiled groove.

8. The system of claim 6, wherein said profiled groove comprises two side walls, each side wall is configured to be lined with a shield constructed from a material having a hardness that is at least as high as the hardness of said saw blade.

9. The system of claim 6, further comprising a reel connected to said cord, said reel is configured for taking up said cord to advance said saw from said first end to said second end of said template.

10. The system of claim 9, wherein said reel is rotated for taking up said cord using a device selected from the group consisting of a motorized rotary device and a hand-powered rotary device.

11. The system of claim 6, said saw is an electrical saw and said system further comprises an electrical switch and a protrusion, said electrical switch operably connected to said saw and said motorized rotary device for controlling the operation of said saw and the operation of said motorized rotary device, said protrusion is attached to a portion of said base, wherein upon said base arriving at said second end of said template, said protrusion is configured to contact said switch to deactivate said saw and said motorized rotary device.

12. The system of claim 6, wherein the work piece having a leading end and a trailing end, said system further comprises a stop disposed under said distal half of said template and said stop is configured for positioning the work piece with the leading end of the work piece contacting the stop when the work piece is positioned by disposing the work piece in a direction from the trailing end to the leading end of the work piece from said proximal half of said template to said distal half of said template.

* * * * *